(12) United States Patent
Li et al.

(10) Patent No.: US 8,686,082 B2
(45) Date of Patent: Apr. 1, 2014

(54) NYLON BASED COMPOSITES

(75) Inventors: Xueping Li, Austin, TX (US); Dongsheng Mao, Austin, TX (US); Zvi Yaniv, Austin, TX (US)

(73) Assignee: Applied Nanotech Holdings, Inc., Austin, TX (US)

( * ) Notice: Subject to any disclaimer, the term of this patent is extended or adjusted under 35 U.S.C. 154(b) by 307 days.

(21) Appl. No.: 13/217,795

(22) Filed: Aug. 25, 2011

(65) Prior Publication Data

US 2012/0052993 A1    Mar. 1, 2012

Related U.S. Application Data

(63) Continuation-in-part of application No. 11/690,713, filed on Mar. 23, 2007, now abandoned.

(60) Provisional application No. 60/785,696, filed on Mar. 24, 2006, provisional application No. 60/819,443, filed on Jul. 7, 2006.

(51) Int. Cl.
   *C08L 77/06* (2006.01)

(52) U.S. Cl.
   USPC .............................. 524/445; 473/579; 525/66

(58) Field of Classification Search
   USPC ....................................................... 524/225
   See application file for complete search history.

(56) References Cited

U.S. PATENT DOCUMENTS

| | | |
|---|---|---|
| 3,655,822 A | 4/1972 | McGrath et al. |
| 3,904,205 A | 9/1975 | Robinson |
| 3,988,287 A | 10/1976 | Inokuchi et al. |
| 4,610,808 A | 9/1986 | Kleiner |
| 4,670,508 A | 6/1987 | Ohdaira et al. |
| 4,740,538 A | 4/1988 | Sekutowski |
| 4,853,282 A | 8/1989 | Peerlkamp |
| 4,861,838 A | 8/1989 | Khanna |
| 4,876,127 A | 10/1989 | Khanna et al. |
| 4,883,836 A | 11/1989 | Thill |
| 4,885,334 A | 12/1989 | Mayumi et al. |
| 4,906,708 A | 3/1990 | Bhattacharjee et al. |
| 4,946,909 A | 8/1990 | Bhattacharjee et al. |
| 4,970,274 A | 11/1990 | Chacko et al. |
| 5,003,003 A | 3/1991 | Olivier |
| 5,091,508 A | 2/1992 | Khanna et al. |
| 5,153,275 A | 10/1992 | Chacko et al. |
| 5,168,108 A | 12/1992 | Chacko et al. |
| 5,234,997 A | 8/1993 | Oda et al. |
| 5,326,811 A | 7/1994 | Sano et al. |
| 5,583,177 A | 12/1996 | Kinoshita et al. |
| 5,759,472 A | 6/1998 | DeFranco et al. |
| 5,763,084 A | 6/1998 | Michels et al. |
| 5,763,502 A | 6/1998 | Barker et al. |
| 5,763,561 A | 6/1998 | Keske |
| 6,257,149 B1 | 7/2001 | Cesaroni |
| 6,605,655 B1 | 8/2003 | Kato et al. |
| 6,627,279 B2 | 9/2003 | Hirota et al. |
| 6,676,793 B2 | 1/2004 | Kobayashi et al. |
| 7,138,452 B2 | 11/2006 | Kim et al. |
| 2003/0004248 A1 * | 1/2003 | Wakamura et al. ........... 524/441 |
| 2004/0122154 A1 | 6/2004 | Reed et al. |

FOREIGN PATENT DOCUMENTS

| WO | WO 03/055792 | | 7/2003 |
|---|---|---|---|
| WO | WO 2006/034388 | * | 3/2006 |

OTHER PUBLICATIONS

Liu et al., "Preparation and characterization of nylon 11/organoclay nancomposites," Polymer 44, pp. 3529-3535, Mar. 4, 2003.

Zhang et al., "Crystal morphology and crystallization kinetics of polyamide-11/clay nanocomposites," Polymer International 53, pp. 1941-1949 (2004).

Fornes et al., "Structure and Properties of Nanocomposites Based on Nylon-11 and -12 Compared with Those Based on Nylon-6," Macromolecules 37, pp. 7698-7709, Jun. 22, 2004.

\* cited by examiner

*Primary Examiner* — Doris Lee

(74) *Attorney, Agent, or Firm* — Kelly Kordzik; Matheson Keys & Kordzik PLLC

(57) ABSTRACT

A nylon 11 composite has significantly improved flexural modulus while keeping or even increasing the impact strength. This composite system may comprise a nylon 11/filler/modifier. The "ball" portion of badminton shuttlecocks made by this type of composite more closely emulate the flight capabilities of natural feather shuttlecocks than neat nylon 11.

11 Claims, 3 Drawing Sheets

NYLON BASED COMPOSITES

This application is a continuation-in-part application of U.S. patent application Ser. No. 11/690,713, which claims priority to U.S. Provisional Patent Application Ser. Nos. 60/785,696, and 60/819,443, which are all incorporated by reference herein.

TECHNICAL FIELD

The present invention relates to nylon based compositions used for the production of badminton shuttlecocks.

BACKGROUND INFORMATION

Nylon 11 is a commercial polymer with excellent piezo-electrical and mechanical properties, and is used in a large range of industrial fields from automotive to offshore applications (see, Tianxi Liu et al., "Preparation and characterization of nylon 11/organoclay nanocomposites," Polymer 44, pp. 3529-3535 (2003)). Nylon 11 may be used for the "ball" portion of a shuttlecock (a high-drag projectile with an open conical shape and a rounded "ball" head) in the game of badminton because of its properties such as impact strength, low melt index, and water resistance properties (see, Qin Zhang et al., "Crystal morphology and crystallization kinetics of polyamide-11/clay nanocomposites," Polymer International 53, pp. 1941-1949 (2004)). In comparison to shuttlecocks made out of feathers of goose or duck, those made out of synthetic nylon 11 are cheaper and more durable.

However, badminton players consider the performance of shuttlecocks made out of synthetic nylon 11 to be poorer than the performance of shuttlecocks with their "ball" portion made out of feathers. In particular, a shuttlecock "ball" made out of nylon 11 may feel too soft. Its flexural modulus is around 400-500 mPa (millipascals), which is much lower than that of a feather shuttlecock. As a result, such nylon 11 materials do not enable the shuttlecock "ball" to restore its shape quickly enough. This causes prolonged wobbling and a decrease in flight distance as compared to shuttlecocks made out of feathers. On the other hand, feather shuttlecocks, due to their rigidity, restore almost instantaneously the aerodynamic shape of the shuttlecock, thereby enabling a nearly flawless flight with little, if any, wobble induced in the flight path.

Fillers, such as clay, have previously been used to reinforce nylon 11 composites see, T. D. Fornes et al., "Structure and properties of nanocomposites based on nylon 11 and 12 compared with those based on nylon 6," Macromolecules 37, pp. 7698-7709 (2004)). The flexural modulus of the nylon 11 composite increased about 80% with a 5.7 wt. % loading of the clay. However, the impact strength decreased by 70%, which would significantly lower the performance of a shuttlecock.

In order to keep a minimum low weight of a skirt of a shuttlecock, gravity plastic materials can be used in making the skirt. For example, U.S. Pat. No. 3,904,205 teaches that polyethylene, polypropylene, EVA, ABS, and nylon can be used for making a shuttlecock skirt. However, the low gravity material addressed in this patent only satisfies the overall weight requirement in the finished shuttlecock, but fails to satisfy the impact strength requirement of the "ball" of the shuttlecock, which as previously noted is also very critical for the performance needs. Furthermore, this patent does not mention that any physical property enhancement may be obtained through cross-linking nylon 11 resin to a reinforcing filler material.

Polyamide reinforcement from inorganic filler material is disclosed in U.S. Pat. No. 3,988,287 and U.S. Published Patent Application No. 2004/0122154 A1. However, U.S. Pat. No. 3,988,287 is restricted to conventional inorganic filler materials, such as talc, clay, mica, silica, quartz, alumina, calcium carbonate, wollastonite, and carbon black; and U.S. Published Patent Application No. 2004/0122154 A1 merely teaches to exfoliate and disperse organo-clay into thermoplastic olefins (TPO) such as nylon. Both of these references fail to teach how to obtain more benefits from cross-linking conventional clay or organo-clay to a nylon resin, and also fail to teach how to overcome the brittleness of the reinforced polyamide material that is caused by the addition of the inorganic filler or organo-clay, nor do they teach or suggest that benefits can be obtained from cross-linking nylon 11 to a functionalized organo-clay material and copolymer modifiers.

U.S. Pat. No. 5,003,003 and U.S. Pat. No. 5,583,177 teach that polyamide can be blended with polyolefin elastomers such as EPDM or SEBS to have improved tensile strength, elongation, and oil resistance properties. Both patents, however, do not teach how to enhance the impact strength of polyamide material, such as using organic clay material to enhance the impact strength of the nylon 11, nor do the patents teach or suggest that useful benefits may be obtained from cross-linking the organo-clay and functionalized copolymer material, such as polyurethane into a nylon 11 resin.

Furthermore, the foregoing four references do not teach or suggest how to adjust the physical properties of a modified nylon 11 material to meet the performance requirements of a shuttlecock. For example, none of these references teach how to tailor, adjust, or customize physical properties of a nylon 11 composite such as toughness, anti-abrasion, low temperature impact resistance (e.g., at −10° C.), fatigue resistant against repeat impact, tear resistance, compression resistance, and flexural strength enhancement under high spinning. For example, U.S. Pat. No. 5,583,177 merely pertains to a polyamide resin composition used for the production of sliding parts, and has nothing to do with utilization of a nylon 11 composition improvement for a shuttlecock or equivalent application.

SUMMARY

In order to address the foregoing problems, the present inventors have focused on how to tailor, improve, and/or customize nylon 11 physical properties in accordance with shuttlecock performance requirements. After intensive studies, it has been found that remarkable improvements are achieved in impact strength, flexural modulus, tensile strength, elongation, anti-abrasion, low temperature impact resistance (e.g., at −10° C.), fatigue resistant against repeat impact, tear resistance, and compression resistance of nylon 11 composites by cross-linking the functionalized organo-clay and co-polymer modifiers with a designated functional group into a nylon 11 resin.

Other designated copolymer modifiers may also be blended into a nylon 11 composite to enhance the fatigue-resistance, anti-abrasion, and flexural strength through high velocity spins and low temperatures. Those copolymer modifiers may be functionalized thermoplastic olefins with amine or carboxyl reactive groups.

In aspects of the present invention, an organic nano-clay from Southern Clay Products used to reinforce the impact strength of nylon 11 was treated with protonated amine and/or a hydroxyl end group on the clay surface. Other inorganic fillers may also be used after surface treatment, such as carbon nanotubes (CNTs), carbon fibers, glass fibers, graphite, mica, or any other equivalent inorganic filler. For example, the clay may comprise montmorillonite modified with a ternary ammonium salt.

A nylon 11 composite in accordance with aspects of the present invention comprises 20-98 wt % nylon 11, 1-50 wt % functionalized inorganic filler material, and 1-50% co-polymer elastomer with a designated function group.

DETAILED DESCRIPTION

Embodiments of the present invention relate to nylon 11 based compositions used for the production of badminton shuttlecocks. More particularly, embodiments of the present invention relate to cross-linking a nylon 11 resin to a functionalized organo-clay material and other copolymer materials with a designated active group to enhance the performance-related physical properties of a shuttlecock by improving both the flexural modulus and impact strength of the modified nylon 11 composite. This results in the modified nylon 11 material being very rigid and yet still have enough flexibility to meet the shuttlecock performance needs. Furthermore, with the addition of a caprolactam crosslink reagent, a nylon 11 composite may be further cross-linked into organo-clay, which provides additional benefits to the physical properties. Embodiments of the present invention adjust the physical properties of the nylon 11 composite to meet the performance requirements of a badminton shuttlecock.

A nylon 11 composite in accordance with embodiments of the present invention has significantly improved flexural modulus while maintaining or even increasing the impact strength. This composite may comprise a nylon 11/filler/modifier.

A nylon 11 composite in accordance with embodiments of the present invention contains a nylon 11 resin, a surface modified organo-clay, and at least one thermoplastic olefin (TPO) with amine (mercaptant, or azide) or carboxylic acids from the maleic anhydride function group.

In embodiments of the present invention, any conventional nylon 11 resin may be used, such as nylon 11 from Arkema (product identifiers: Rilsan BMNO, BMFO). The base organo-filler material may be obtained from commercially available sources, such as clay 93A from Southern Clay Products. The copolymer modifiers may be selected from various commercially available resources for TPOs with designated functional groups of amine and unsaturated carboxylic acid groups—for example, product identifier Santo from Advanced Polymer, product identifier G7723/G1726M from Shell Chemical Co, and product name Fusabond from Dupont Chemical Co.

To further enhance physical properties of a nylon 11 composite, a caprolactam ring-opening reagent may be added to the nylon resin/organo-clay/copolymer mixture, wherein the reactive functional group of amine (e.g., protonated n ternary or quaternary amine) and hydroxyl group of the organo-clay, and/or the reactive group of copolymer modifiers, at the present of caprolactam reagent, are cross-linking to the nylon 11 resin.

An example of such a composite is nylon 11 (45% wt.)/clay (20% wt.)/elastomer (35% wt.), which possesses flexural modulus and impact strength increases greater than 150% and 80%, respectively, compared with neat nylon 11.

Figure 2:
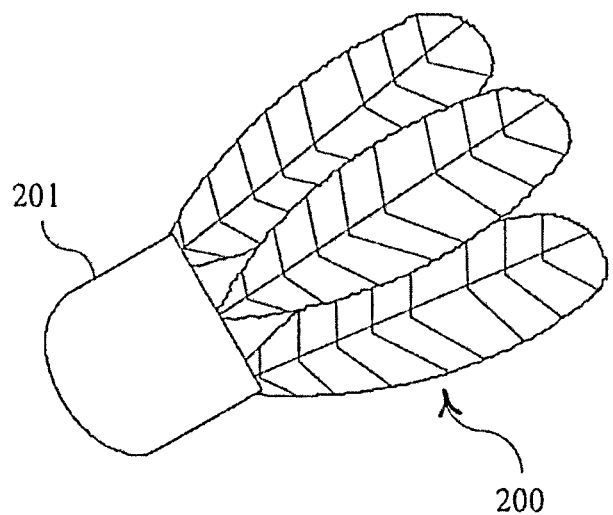
FIG. 2 illustrates a shuttlecock configured in accordance with embodiments of the present invention.

Referring to FIG. 2, the "ball" portion 201 of a badminton shuttlecock 200 made with composites described herein more closely duplicates the flight capabilities of natural feather (e.g., duck) shuttlecocks than those made merely with neat nylon 11. The nylon 11/filler/modifier emulates the restoration effects of shuttlecocks made from feathers, thereby providing a product that is a one-for-one aerodynamic performance substitution for the natural product (feathers). Furthermore, the nylon 11/filler/modifier shuttlecock not only performs similarly to the natural product, but is also easier and cheaper to manufacture, and more durable than the natural product.

In embodiments of the present invention, besides clay, other fillers, such as graphite particles, carbon black, carbon fibers, fullerenes, carbon nanotubes, glass fibers, ceramic particles, or any other equivalent metallic, semiconductive, or insulating particles may be utilized. Beside elastomer, other polymer modifiers, such as plasticizer, compatiblizer, or other impact modifiers may be utilized including a maleic anhydride grafted modifier, such as a maleic anhydride grafted polyolefin elastomer, such as ethylene-propylene, polyethylene-octene. Such a modifier better disperses the clay particles, which improves mechanical properties of the polymer/clay nanocomposites, such as flexural modulus, and provides the polymer with elastic properties, which improves the impact strength.

In embodiments of the present invention, nylon 11 pellets were mixed with clay and elastomer powders by a ball-milling process followed by an extrusion (e.g., melt compounding) process. A detailed example of such embodiments is provided as follows. Nylon 11 pellets were commercially obtained from Arkema Co., Japan (product identifier: RILSAN BMV-P20 PA11). Clay was commercially obtained from Southern Clay Products (product identifier: Cloisite series 93A), which is a natural montmorillonite modified with a ternary ammonium salt. The elastomer was styrene/ethylene butylenes/styrene (SEBS), commercially obtained from Kraton Inc. (product identifier: G1657).

Figure 1:
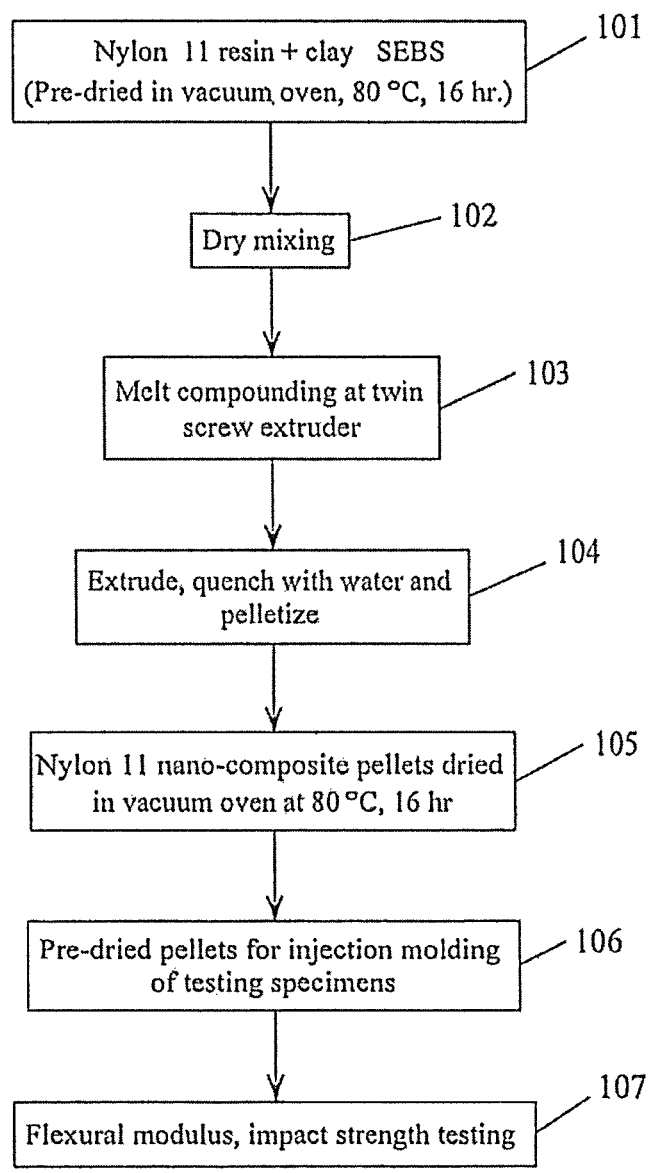
FIG. 1 illustrates a flow diagram in accordance with embodiments of the present invention.

FIG. 1 illustrates a process flow to make nylon 11/clay/SEBS composites. In step 101, the ingredients may be optionally dried in a vacuum oven (e.g., at approximately 70-80° C. for approximately 16 hours) to eliminate moisture. In step 102, the ingredients are mixed (e.g., they may be placed in a plastic bag at different weight ratios and dry mixed by hand for approximately half an hour) in a pre-extrusion mixing process in order to obtain a dispersion (e.g., approximately uniform) of the materials. In step 103, the nylon11/clay/SEBS composites are blended (e.g., utilizing a HAAKE Rheomex CTW 100 twin screw extruder). Following are the approximate parameters that may be used in this process:

Screw zone 1 temperature—230° C.;
Screw zone 1 temperature—220° C.;
Screw zone 1 temperature—220° C.;
Die temperature—230° C.;
Screw speed—100 rpm.

The temperature of the mixture is designed according to the melting points of the nylon 11 and copolymer modifiers.

An approximate quantity of the nylon 11 pellets and clay for each operation may be 1 pound. The twin screw may need to be cleaned using the mixture before collecting the composite resin. In step 104, the nanocomposite fiber may be quenched in water and palletized (e.g., using a Haake PPI Palletizer POSTEX) after the extrusion process. In step 105, the nanocomposite pellets may be dried (e.g. at approximately 70-80° C.) prior to the injection molding process. In step 106, a laboratory-scale injection molding machine (e.g., Mini-Jector, model 55, Mini-Jector Machinery Corp.) may be used to make impact bars. The samples may be molded for testing with specific dimensions using ASTM-specified molds (e.g., ASTM D256 for impact strength testing, ASTM D790 for flexural modulus testing). Following are the approximate parameters that may be used:

Injection pressure—70 bar;
   Holding pressure—35 bar;
   Holding time—40 seconds;
   Heating zone 1 temperature—220° C.;
   Heating zone 2 temperature—220° C.;
   Nozzle temperature—230° C.;
   Mold temperature—60-80° C.

The molding temperature and pressure setting may be designed and adjusted according to the melting point and melt flow index of the nylon 11 resin and copolymer modifiers.

The specimens may be dried (e.g., in a desiccator for approximately 40 hours of conditioning) before a testing process. Flexural modulus and impact strength testing of the samples may be characterized (e.g., using a standard 3-point bending method) in step 107.

Table 1 shows the mechanical properties of flexural modulus and impact strength of nylon 11/clay/SEBS composites made with different weight ratios in accordance with embodiments of the present invention:

TABLE 1

| Composite Sample ID | Nylon 11 wt. % | Clay wt. % | Rubber SEBS wt. % | Extrusion speed (rpm) | Flexural modulus (GPa) | Impact strength (kgf cm/cm) |
|---|---|---|---|---|---|---|
| 1 | 100 | 0 | 0 | NA | 0.572 | 38.5 |
| 2 | 95 | 5 | 0 | 100 | 0.928 | 21.2 |
| 3 | 90 | 10 | 0 | 100 | 1.33 | 20.4 |
| 4 | 80 | 20 | 0 | 100 | 1.90 | 12.5 |
| 5 | 76 | 20 | 4 | 100 | 2.11 | 11.0 |
| 6 | 72 | 20 | 8 | 100 | 2.09 | 20.1 |
| 7 | 70 | 15 | 15 | 100 | 1.74 | 30.7 |
| 8 | 60 | 20 | 20 | 100 | 2.01 | 28.0 |
| 9 | 45 | 20 | 35 | 100 | 1.60 | 72 |

A total number of 9 composites were made and tested, as can be seen in Table 1. Compared with the flexural modulus of neat nylon 11 (identified as Composite Sample 1), the flexural modulus of Composite Samples 2, 3, and 4 was increased by increasing the clay loading. However, the impact strength was decreased. Composite Samples 5-9 were the nylon 11/clay/SEBS composites. In general, the flexural modulus of the composites should be decreased by adding modifiers, but compared with Composite Sample 4, the flexural modulus of Composite Samples 5 and 6 actually increased by adding 4 and 8 wt. % SEBS loading, respectively. The flexural modulus may have increased because the clay particles were more thoroughly dispersed from the addition of low viscosity SEBS during the extrusion process. With respect to Composite Samples 5-9, the impact strength was increased by increasing the SEBS loading. Composite Sample 9, which had 35 wt. % SEBS loading, had a 77.8% higher impact strength than that of neat nylon 11 (Composite Sample 1). In addition, the flexural modulus of Composite Sample 9 increased by approximately 178% in comparison with neat nylon 11 (Composite Sample 1).

Utilizing the process flow illustrated in FIG. 1, functionalized organo-clay with proper surface treatment was melt-mixed with nylon 11 and other copolymer modifiers (e.g., TPO) through a twin screw extruder, resulting in the functionalized organo-clay exfoliated and cross-linked into nylon 11 (e.g., extrusion speed at approximately 100 rpm at approximately 230° C.).

Table 2 shows the remarkably improved physical properties of the nylon 11 composites compared to neat nylon 11 (N11) resin. The target values represent desired values for each category for a shuttlecock.

TABLE 2

| Materials | Flexural Modulus (GPa) | Impact Strength (kgf cm/cm) with 2 lb loading | Elongation @ breakpoint (%) |
|---|---|---|---|
| Neat N11 | 0.553 | 12.3 | 235 |
| Target | 1.38 | 12.3 | 235 |
| #1 N11 composite - 1 | 1.2 | 40 | >600 |
| #2 N11 composite - 2 | 1.35 | 22 | >400 |
| #3 N11 composite - 3 | 1.5 | 37 | >400 |
| #4 N11 composite - 4 | 1.7 | 29 | >400 |

Subsequent to producing the nylon 11 composites with the desired physical properties, all selected nylon 11 composite materials were made into nylon 11 shuttlecock "balls" and tested. Table 3 shows the compression properties of the nylon 11 nanocomposites compared to neat nylon 11 in shuttlecock form. All specimens were made in the shape of a commercial shuttlecock and the physical properties tested accordingly.

TABLE 3

Composite Samples in shuttlecock form for compression test

| | Components (wt. %) | | | |
|---|---|---|---|---|
| Composite Sample ID | N11 | Functionalized-organo-clay | Co-polymer modifier with designated reactive group | Mechanical properties Compression (N) |
| #21 | 95 | 5 | 0 | 24.5 |
| #19 | 90 | 5 | 5 | 25.3 |
| #18 | 85 | 5 | 10 | 23.1 |
| #42 | 80 | 5 | 15 | 21.7 |
| Neat N11 | | | | 18.5 |
| Target Value | | | | 24.05 |

The compression value of a shuttlecock plays an important role in the overall shuttlecock performance, it is a key factor to evaluate whether the "man-made shuttlecock" is compatible with a natural feather-based shuttle cock. A good compression value for the shuttlecock means that the composite material must be rigid and sufficiently flexible to pass the test. From Table 3, formulations #21 and #19 satisfactorily meet the desired Target Value for a nylon 11 based shuttlecock.

Figure 3A:
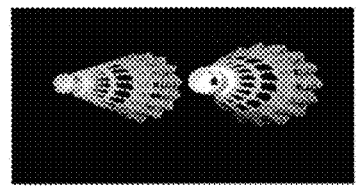
FIGS. 3A-3B show digital images of shuttlecocks.
Figure 3B:
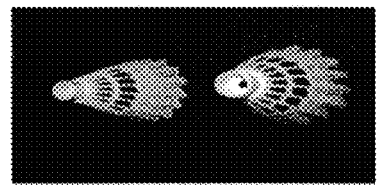

FIGS. 3A-3B show shuttlecocks after impact and compression durability testing under low temperature (e.g., −10° C.), within a testing frame of 1 min and an extended test time of 3-4 min. FIG. 3A shows a shuttlecock made from neat nylon 11, and FIG. 3B shows a shuttlecock made with a nylon composite in accordance with embodiments of the present invention. The target compression value of the shuttlecock shown in Table 3 is still satisfied under such extreme low temperature testing.

All references cited in this application are incorporated by reference herein.

What is claimed is:

1. A badminton shuttlecock comprising a composite material of nylon 11, a surface treated filler, and a copolymer modifier with reactive groups.

2. The badminton shuttlecock as recited in claim 1, wherein the surface treated filler comprises one or more of the following: organic clay, inorganic clay, graphite, carbon black, C60, carbon nanotubes, carbon fiber, ceramic, glass fiber, or any other metallic, semiconductive, and insulating particles.

3. The badminton shuttlecock as recited in claim 1, wherein the reactive group is selected from the group consisting of an amine anhydride group, a carboxyl anhydride group, and a maleic anhydride group.

4. The badminton shuttlecock as recited in claim 1, wherein the copolymer modifier is a maleic anhydride grafted polyolefin elastomer.

5. The badminton shuttlecock as recited in claim 1, wherein the maleic anhydride grafted polyolefin elastomer is either a maleic anhydride grafted ethylene-propylene or a maleic anhydride grafted polyethylene-octene.

6. The badminton shuttlecock as recited in claim 1, further comprising a caprolactam monomer.

7. The badminton shuttlecock as recited in claim 6, wherein the reactive group is selected from the group consisting of an amine anhydride group, a carboxyl anhydride group, and a maleic anhydride group.

8. A badminton shuttlecock comprising a composite material of nylon 11, clay particles, and an elastomer.

9. The badminton shuttlecock as recited in claim 8, wherein the composite material makes up a ball portion of the badminton shuttlecock.

10. The badminton shuttlecock as recited in claim 8, wherein the elastomer comprises styrene/ethylene butylenes/styrene ("SEBS").

11. The badminton shuttlecock as recited in claim 8, wherein the clay particles comprise a natural montmorillonite modified with a ternary ammonium salt.

* * * * *